Sept. 29, 1942.   F. G. BACK   2,297,603
MOTION PICTURE CAMERA
Filed Aug. 30, 1940   2 Sheets-Sheet 1

INVENTOR:
Franz G. Back,
BY
AGENT.

Sept. 29, 1942.                F. G. BACK                  2,297,603
                         MOTION PICTURE CAMERA
                         Filed Aug. 30, 1940              2 Sheets-Sheet 2
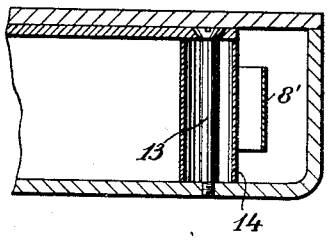
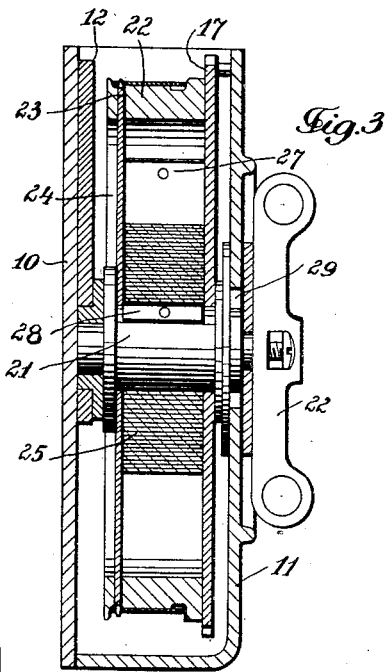
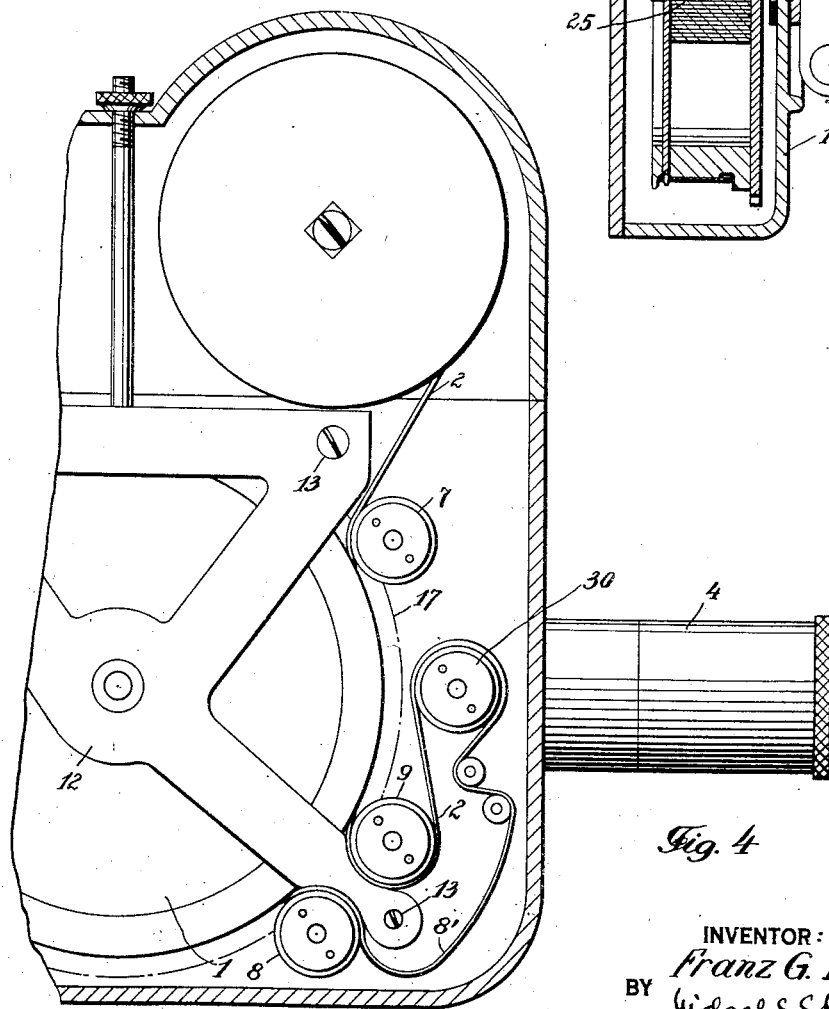
INVENTOR:
Franz G. Back
BY
    AGENT.

Patented Sept. 29, 1942

2,297,603

UNITED STATES PATENT OFFICE 2,297,603

MOTION PICTURE CAMERA

Franz G. Back, New York, N. Y., assignor of one-fourth to Gastro-Photor Laboratories, New York, N. Y.

Application August 30, 1940, Serial No. 354,795

15 Claims. (Cl. 88—16.2)

My invention relates to motion picture cameras, and more particularly to cameras of the type in which the film is moved continuously rather than intermittently.

It is the main object of my present invention to provide a camera which is of small size, compact, and enables with a relatively small number of parts to solve the problem of making motion picture records on a continuously moving film.

It is a further object of my present invention to combine with a camera of the type described above sound recording means in such a way that also the sound records produced are of good quality and can be reproduced for all purposes whatever.

Another object of my present invention is to produce with my new camera these sound and corresponding motion picture records on the same continuously moving film at the distance required for reproduction purposes.

Still a further object of my present invention consists in reducing the size of my new camera by combining in a new manner the sprocket drum carrying the film during exposure with the driving means for this sprocket drum.

In order to attain the above objects I propose to provide in a motion picture camera a sprocket drum for the film to be exposed, driving means for said sprocket drum, said driving means being arranged within said drum, and means being adapted to expose said film while in contact with said sprocket drum.

In accordance with a preferred embodiment of my invention I combine in a motion picture camera of the type proposed by me, a sprocket drum for the film to be exposed, said drum being adapted to move said film during exposure with uniform speed, spring-actuated driving means for rotating said sprocket drum, said driving means being arranged substantially within and concentrically with said drum, an optical system for making motion picture records on said film while in contact with said sprocket drum, said system including a stationary camera lens and rotating compensating means being arranged between said lens and said continuously moving sprocket drum.

I further propose to provide, in combination with the compensating means mentioned above, means being adapted to rotate these compensating means in synchronism with the sprocket drum. These means preferably consist in a motion transmitting mechanism being driven by the driving means for the sprocket drum or by the sprocket drum itself.

For producing sound motion pictures I arrange in my new camera a separate optical unit adapted to produce sound records on the exposed film while this is still in contact with the continuously moving drum; I want, however, to stress that—although the above arrangement is the preferred one—I may also provide a separate film-driven free-running recording drum in combination with said sound recording unit.

As the motion picture and sound records are to be made while the film is in contact with and driven by the same sprocket drum, it is necessary to arrange this sprocket drum, the optical systems and the eventually necessary guiding rollers in such a way that the length of the film strip between the two optical systems is equal to the distance required between picture frame and corresponding sound records on a finished film of the type produced by said camera. I have furthermore found that for this purpose it is of advantage to use a sprocket drum having a circumference being greater than this distance: preferably, the sprocket drum should be of such a size that the two optical systems may be arranged, at 180 degrees to each other, on opposite sides of the sprocket drum.

Further characteristic features of my new camera and advantages of the improvements proposed by me will appear from the following description and the accompanying drawings illustrating two embodiments of my invention.

In the drawings

Fig. 2 is a cross section of the guiding rollers along the line 2—2 of Fig. 1,

Fig. 3 is a cross section of the camera along the line 3—3 of Fig. 1, without showing the reels and the reel cover, Fig. 4 is a plane view of my new camera showing another construction of the sound recording unit.

Figure 1:
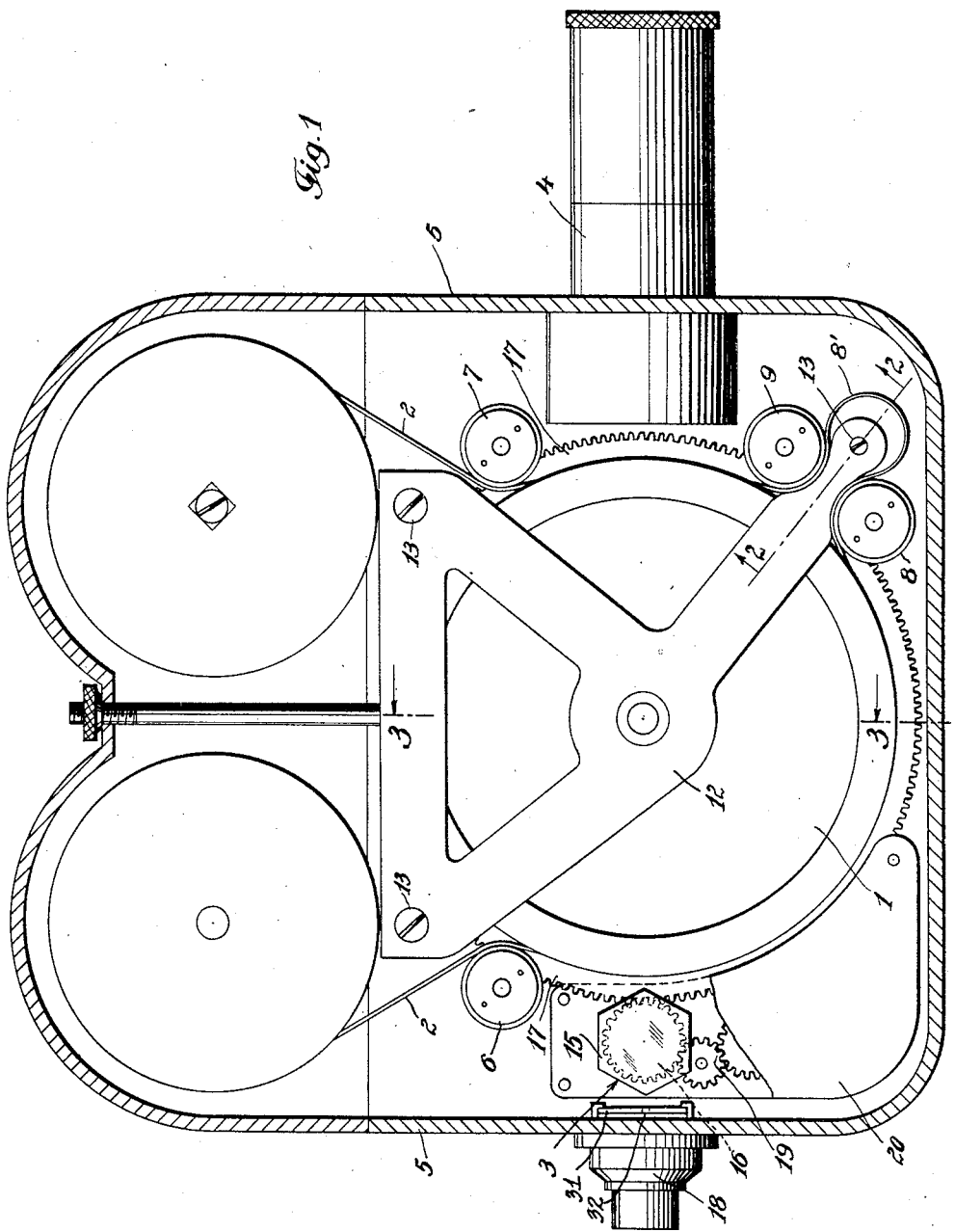
Fig. 1 is a plane view of my new camera, partly in section.

As shown in Fig. 1 my new camera includes a sprocket drum 1, carrying the film 2 to be exposed, an optical system 3 for making motion picture records, and an optical system 4 for making sound records on the film 2, while this is in contact with the sprocket drum 1. The optical systems 3 and 4 are arranged on opposite sides of the sprocket drum 1 at 180° to each other. All these parts of the film-feeding mechanism and the recording system are enclosed within the camera casing 5.

It is easy to understand that when making motion picture as well as sound records on the same film strip while this is in contact with and driven by a single sprocket drum, no relative dislocation of sound and motion picture records is possible; furthermore, a sprocket drum of such a relatively great diameter is adapted to serve also as fly-wheel and has therefore a very uniform and constant speed of rotation.

For guiding the film 2 in contact with the sprocket drum 1 guiding rollers 6 and 7 are provided for. I have found it advantageous to provide a film loop 8' in the film while it passes from the optical system making the motion picture records to the optical system recording the sound on the film. This film loop is formed, in a manner known per se, by the guiding rollers 8 and 9. As may be seen from the drawing this film loop solves also the problem how to journal the sprocket drum 1 without interfering with the film path: the supporting plate 12, being arranged on the side of sprocket drum 1, which faces the casing-cover 10, is fastened to the camera casing at three points. One of these points lies near the circumference of the sprocket drum 1 substantially between the guiding rollers 8 and 9. As shown in Fig. 2, the supporting plate 12 is fastened by screws 13 to the casing wall 11, lying behind the sprocket drum. A sleeve 14 is arranged around screw 13. The optical system 3 for making the motion picture records includes a compensating prism 15 arranged on one shaft with pinion 16. Pinion 16 is driven by the toothed disk 17 fixed to and forming a part of the sprocket drum 1. A camera lens 18 is arranged in front of this prism cooperating with this rotating compensating prism.

This optical system includes also a member 31 forming a slit 32 limiting the vertical aperture of lens 18. By using this slit 32, limiting the vertical aperture of the lens, incorrect definition of the picture is avoided and simultaneously astigmatic errors are materially reduced.

Cooperating with and driven by pinion 16 is a speed-regulating mechanism 19; as this mechanism is of the usual type, it is not shown in detail. The main parts of this mechanism are arranged under cover plate 20.

Sprocket drum 1 is shown in Fig. 3 in detail. This figure shows a cross section of camera casing 5 and casing cover 10, forming the space within which the sprocket drum 1 is arranged. The drum is carried by a shaft 21 rotatably mounted at its one end in the rear wall 11 of camera casing 5 and at its other end in the supporting plate 12. Sprocket drum 1 is arranged freely rotatably on this shaft.

The drum consists of a toothed disk 17, a cylindrical member 22, a sprocket disk 23 and a disk 24 limiting the lateral movement of the film carried by the drum. These four parts of the drum are fixed to each other, as shown in the drawings, forming thereby a cylindrical space for the spiral spring 25 arranged within the sprocket drum. It is of advantage to fix the parts of the drum to each other by screws in order to enable introducing of the spring into the drum and its replacement, should it be necessary.

One end 27 of spring 25 is fixed to the inner surface of the cylindrical member 22 and the other end 28 to the outer surface of shaft 21, thereby forming a spring connection between shaft 21 and the rotatable sprocket drum 1. Turning shaft 21 by winder 22 the spring 25 is wound up. A ratchet mechanism 29 is provided for blocking the rotation of the shaft contrary to the direction of winding-up. By blocking the rotating movement of the drum during, and releasing it after winding-up of the spring, it is possible to attain, with help of the speed regulating means 19, a uniform and constant movement of drum 1.

As may be seen from the drawings and the above description, my new sprocket drum—combining in one unit the sprocket for carrying the film during exposure and the rotating means —makes it possible to arrange the whole film-feeding mechanism in a relatively small space, reducing thereby considerably the size of my new camera compared with cameras of the usual type.

Although my new sprocket drum enables me to carry out both motion picture and sound recording while the film is in contact and driven by this drum, and although I prefer to use this arrangement, I want to point out that I may also provide a separate film-driven recording drum for sound recording, as shown in Fig. 4. As may be seen from this figure, I need not change substantially the arrangement of my camera: I only change the arrangement of the sound recording unit 4 in order to have the possibility to arrange between recording unit 4 and sprocket drum 1 the free-running sound recording drum 30; this drum has no sprockets and is driven by the film itself. In order to make the rotation of this drum 30 uniform and constant, it is of advantage to arrange a fly-wheel on its shaft, which wheel is not shown in the drawings. I want, however, to stress that also in this arrangement the film is driven by sprocket drum 1 only: the uniformity of speed for recording the moving pictures as well as for sound recording is attained by a single sprocket drum 1, driving the film as described above.

It will be understood that each of the elements of my new camera, or two or more together, may also find a useful application in other types of cinematographic apparatus differing from the type above described.

While I have illustrated and described my new invention as embodied in cinematographic apparatus, I do not intend to be limited to the details shown, since various modifications and structural changes may be made without departing in any way from the spirit of my invention.

Without further analysis the foregoing will so fully reveal the gist of my invention that others can by applying current knowledge readily adapt it for various applications without omitting features, that, from the standpoint of the prior art fairly constitute essential characteristics of the generic or specific aspects of my invention, and therefore such adaptations should and are intended to be comprehended within the meaning and range of equivalency of the following claims.

What I claim as new and desire to secure by Letters Patent is:

1. In a motion picture camera a sprocket drum for the film to be exposed, spring-actuated driving means for rotating said sprocket drum with uniform speed, said driving means arranged substantially concentrically within said drum, an optical system for making motion picture records on said film while in contact with said sprocket drum, said system including a stationary camera lens and a rotating compensating means arranged between said lens and said sprocket drum, and means adapted to rotate said compensating means in synchronism with said sprocket drum.

2. In a motion picture camera a sprocket drum for the film to be exposed, spring-actuated driving means for rotating said sprocket drum with uniform speed, said driving means arranged substantially within and concentrically with said drum, an optical system for making motion picture records on said film while in contact with said sprocket drum, said system including a stationary camera lens and a rotating compensating means arranged between said lens and said sprocket drum, and motion transmitting means driven by the driving means for said sprocket drum, said motion transmitting means adapted to rotate said compensating means in synchronism with said sprocket drum.

3. In a motion picture camera a sprocket drum for the film to be exposed, spring-actuated driving means for rotating said sprocket drum with uniform speed, said driving means arranged substantially within and concentrically with said drum, an optical system for making motion picture records on said film while in contact with said sprocket drum, said system including a stationary camera lens and a rotating compensating means arranged between said lens and said sprocket drum, and motion-transmitting means driven by said sprocket drum and adapted to rotate said compensating means in synchronism with said sprocket drum.

4. In a motion picture camera a sprocket drum for the film to be exposed, spring-actuated driving means adapted to rotate said sprocket drum with uniform speed, said driving means arranged substantially within and concentrically with said drum, an optical system for making motion picture records on said film while in contact with said sprocket drum, and an optical unit for making sound records on the exposed film while the same is still in contact with said sprocket drum.

5. In a motion picture camera of the type claimed in claim 4, said sprocket drum having such a size that its circumference is greater than the distance required between picture frame and corresponding sound records on a finished film of the type produced by said camera.

6. In a motion picture camera a sprocket drum for the film to be exposed, spring-actuated driving means adapted to rotate said sprocket drum with uniform speed, said driving means arranged substantially within and concentrically with said drum, an optical system for making motion picture records, an optical system for sound recording, guiding rollers for said film, said sprocket drum, optical systems, and guiding rollers arranged in such a manner that the recording of the moving pictures as well as the sound recording on the film is carried out while said film is in contact with and driven by said sprocket drum.

7. In a motion picture camera a sprocket drum for the film to be exposed, spring-actuated driving means for rotating said sprocket drum with uniform speed, said driving means arranged substantially within and concentrically with said drum, an optical system for making motion picture records, an optical system for sound recording, guiding rollers for said film, said sprocket drum, optical systems, and guiding rollers arranged in such a manner that the recording of the moving pictures as well as the sound recording of the film is carried out while said film is in contact with and driven by said sprocket drum, and that the length of the film strip between the places where the motion picture and sound records are made is equal to the distance required between picture frame and corresponding sound records on a finished film of the type produced by said camera.

8. In a motion picture camera a sprocket drum for the film to be exposed, spring-actuated driving means for rotating said sprocket drum with uniform speed, said driving means arranged substantially within and concentrically with said drum, an optical system for making motion picture records arranged on one side of said drum, an optical system for sound recording arranged on the opposite side of said drum, said optical systems positioned at 180° to each other, and guiding rollers for said film, said sprocket drum, optical systems, and guiding rollers arranged in such a manner that the recording of the moving pictures as well as the sound recording on the film is carried out while said film is in contact with and driven by said sprocket drum and that the length of the film strip between the places where the motion picture and sound records are made is equal to the distance required between picture frame and corresponding sound records on a finished film of the type produced by said camera.

9. In a motion picture camera of the type claimed in claim 6, a supporting plate adapted to support the cover-facing end of the shaft of said sprocket drum, means for fastening said supporting plate at three points to the camera casing, thereby enabling adjustment of the sprocket drum within said casing, one of said fastening means including bolt-like connecting means arranged substantially parallel to said shaft and near to the periphery of said sprocket drum, said connecting means fastening the supporting plate on the cover-facing side of the drum to the camera wall behind this drum, and guiding rollers arranged near said connecting means in such a manner as to be adapted to form a film loop around said connecting means.

10. In a motion picture camera a sprocket drum for the film to be exposed, spring-actuated driving means for rotating said sprocket drum with uniform speed, said driving means arranged substantially within and concentrically with said drum, an optical system for making motion picture records on said film while in contact with said sprocket drum, a film-driven free-running recording drum, and an optical unit adapted to produce sound records on the exposed film while in contact with said recording drum.

11. In a motion picture camera of the type claimed in claim 1, said optical system comprising in combination with said stationary camera lens a member forming a slit limiting the vertical aperature of said lens.

12. In a motion picture camera of the type claimed in claim 1, a driving pinion arranged coaxially with and fixed to said sprocket drum, said driving pinion having a larger diameter than said sprocket drum, and a driven pinion being in mesh with said driving pinion and being fixed to the rotating compensating means, thus rotating said compensating means in synchronism with said sprocket drum.

13. In a motion picture camera of the type claimed in claim 1, said sprocket drum comprising a toothed disk, a cylindrical member forming substantially the entire circumferential surface of said sprocket drum at least one sprocket disk provided with sprocket teeth for engaging the film, and means for concentrically fastening said toothed disk to the one side and said sprocket disk to the other side of said cylindrical member, thus forming a closed cylindrical space for said spring actuated driving means arranged within said sprocket drum.

14. In a motion picture camera of the type claimed in claim 4, said spring actuated driving means comprising a centrally arranged shaft supporting said sprocket drum in the camera casing in such a manner as to enable its free rotation around said shaft, a driving spiral spring within said sprocket drum arranged centrically around said shaft, means connecting one end of said spring to said shaft, means connecting the other end of said spring to said sprocket drum, means for turning said shaft and thereby winding up said spring, and a rachet mechanism preventing turning of said shaft against the winding-up direction.

15. In a motion picture camera of the type claimed in claim 3, in combination with the motion-transmitting means driven by the sprocket drum and rotating said compensating means, a speed-regulating mechanism connected to and cooperating with said motion-transmitting means, holding thus the speed of rotation of said sprocket drum as well as of said compensating means uniform and constant.

FRANZ G. BACK.